WEB INSPECTION DEVICE WITH MODIFIED DEFECT SIGNAL CONTROL

Filed May 1, 1964 5 Sheets-Sheet 1

INVENTOR
JAMES STEPHENS LINDERMAN

BY William B. Cridlin, Jr.
ATTORNEY

WEB INSPECTION DEVICE WITH MODIFIED DEFECT SIGNAL CONTROL

Filed May 1, 1964 5 Sheets-Sheet 2

INVENTOR
JAMES STEPHENS LINDERMAN

William B. Cridlin, Jr.
ATTORNEY

Dec. 26, 1967 J. S. LINDERMAN 3,360,651

WEB INSPECTION DEVICE WITH MODIFIED DEFECT SIGNAL CONTROL

Filed May 1, 1964 5 Sheets-Sheet 3

INVENTOR

JAMES STEPHENS LINDERMAN

BY William B. Cridlin, Jr.

ATTORNEY

WEB INSPECTION DEVICE WITH MODIFIED DEFECT SIGNAL CONTROL

Filed May 1, 1964 5 Sheets-Sheet 4

INVENTOR
JAMES STEPHENS LINDERMAN

BY William B. Cridlin, Jr.
ATTORNEY

Dec. 26, 1967 J. S. LINDERMAN 3,360,651

WEB INSPECTION DEVICE WITH MODIFIED DEFECT SIGNAL CONTROL

Filed May 1, 1964 5 Sheets-Sheet 5

INVENTOR
JAMES STEPHENS LINDERMAN

BY

ATTORNEY 3,360,651
WEB INSPECTION DEVICE WITH MODIFIED DEFECT SIGNAL CONTROL

James Stephens Linderman, Wilmington, Del., assignor to E. I. du Pont de Nemours and Company, Wilmington, Del., a corporation of Delaware Filed May 1, 1964, Ser. No. 364,152
8 Claims. (Cl. 250—219)

ABSTRACT OF THE DISCLOSURE

An apparatus for continually detecting defects in a web material by scanning the material with a light source thereby creating a photoelectric carrier signal to detect any defects in the web. The passage of the carrier signal is gated to remove to a predetermined segment of the leading edge and trailing edge of said carrier signal. The gate mechanism automatically adjusts to the size of the web to precisely remove the leading and trailing edge of the carrier signal.

One of the better methods for detecting surface irregularities of a fast moving web is by scanning a spot of light traversely across the web surface and have the spot of light reflect from the web surface to an optical-electronic converter to change any irregularities in reflection into electrical impulses. The spot of light should be of uniform size and should repeatedly scan the web so that all of the web is inspected as it passes the inspection station. A suitable scanning device would be a rotating drum mirror which rotates at an extremely high speed (i.e., 12,000 r.p.m.) and is located in such a position that suitable non-actinic light impinging upon the rotating mirror would reflect from the mirror, quickly traverse the web and reflect from the web to an optical-electronic converter. The light reflected to the converter by the web forms a base or pedestal signal from which defects can be detected. Several instruments are known in the prior art which can operate in the manner previously described. One of such instruments is found in U.S. Patent 2,393,631.

However, problems arise when these instruments are used to scan the web or photographic film. Often the web being inspected has to meet its most critical quality specifications within a particular distance from each side of the web. This is particularly true when inspecting cine photographic film where the useful photographic area is found between the edges which will be perforated on each side of the film. If the inspection is made before perforating the film, defects within the leading and trailing edges of the film would not be serious since these edges will be perforated. Therefore, a practical system is needed which will gate out the pedestal signal given for the leading edge and trailing edge of the web. This problem is increased due to the fact that the web will often weave from side to side at the point where the light spot scans the web. An additional problem is obtaining a detector which will gate out the edges of the film but will also automatically adjust to accept different sizes of film.

It is an object of this invention to provide a web defect detector. Another object is to provide a web defect detector capable of adjusting its detector signal to cover only the usable portion of the web being inspected. A further object is to provide an adjusting circuit for said detector where the trailing edge of the detector signal is automatically eliminated by a preselected amount. Other objects will appear hereinafter.

These and other objects are accomplished by this invention which is particularly described in the appended claims and the preferred embodiments as detailed in the drawings, and following discussion.

The invention is directed to an optical system by which a focused moving spot of non-actinic light scans the web and the reflected light is collected on the face of the photomultiplier, a photomultiplier for optical to electrical signal conversion, and an electronic system for processing the defect signal so that it can be indicated on a recorder.

Figure 1:
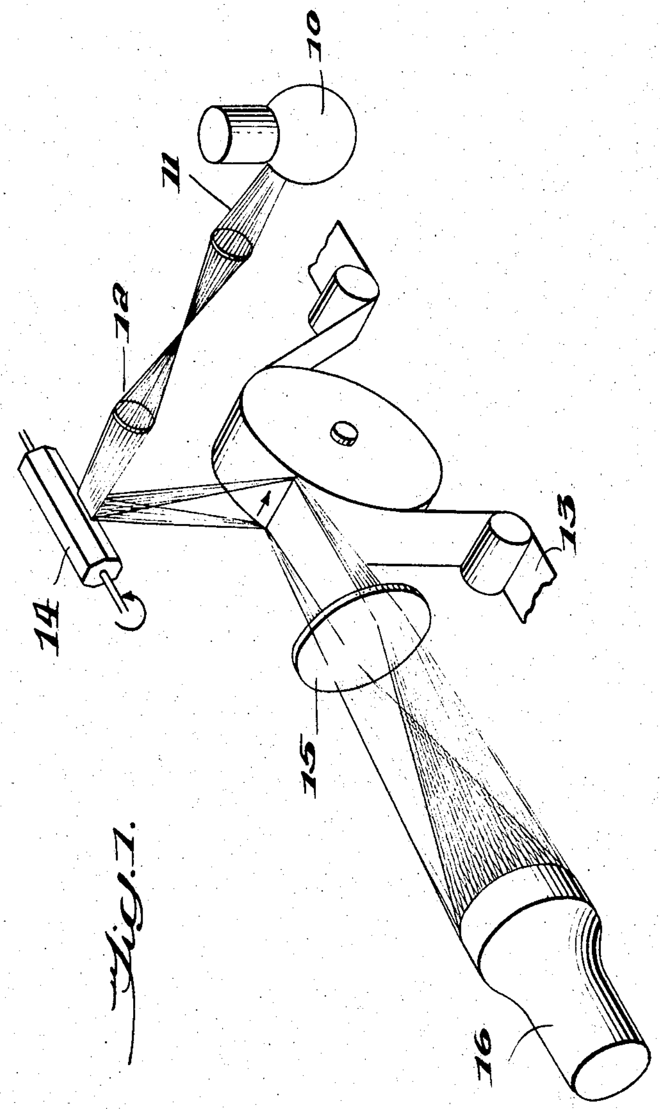
FIG. 1 is an isometric drawing of the optical system.

Referring to FIG. 1, light from a source 10 is brought to an image by lens 11. It is then collected by lens 12 which projects the light onto mirror 14. The converging light beam from lens 12 falls on a rotating octagon mirror 14 that causes the light image to traverse the web from side to side. The moving spot of light is reflected from the surface of web 13 and collected by a lens 15 that causes the diverging scanning beam to reconverge on a photomultiplier tube 16.

The photomultiplier output voltage is approximately −0.3 v. when the inspection light spot is on the web and zero volts when the light beam is off the web. Therefore, as the spot enters, traverses, and leaves the web during the scanning sequence a pedestal-type signal is formed. Any defect encountered during the scan causes a positive or negative signal on this pedestal.

Figure 2:
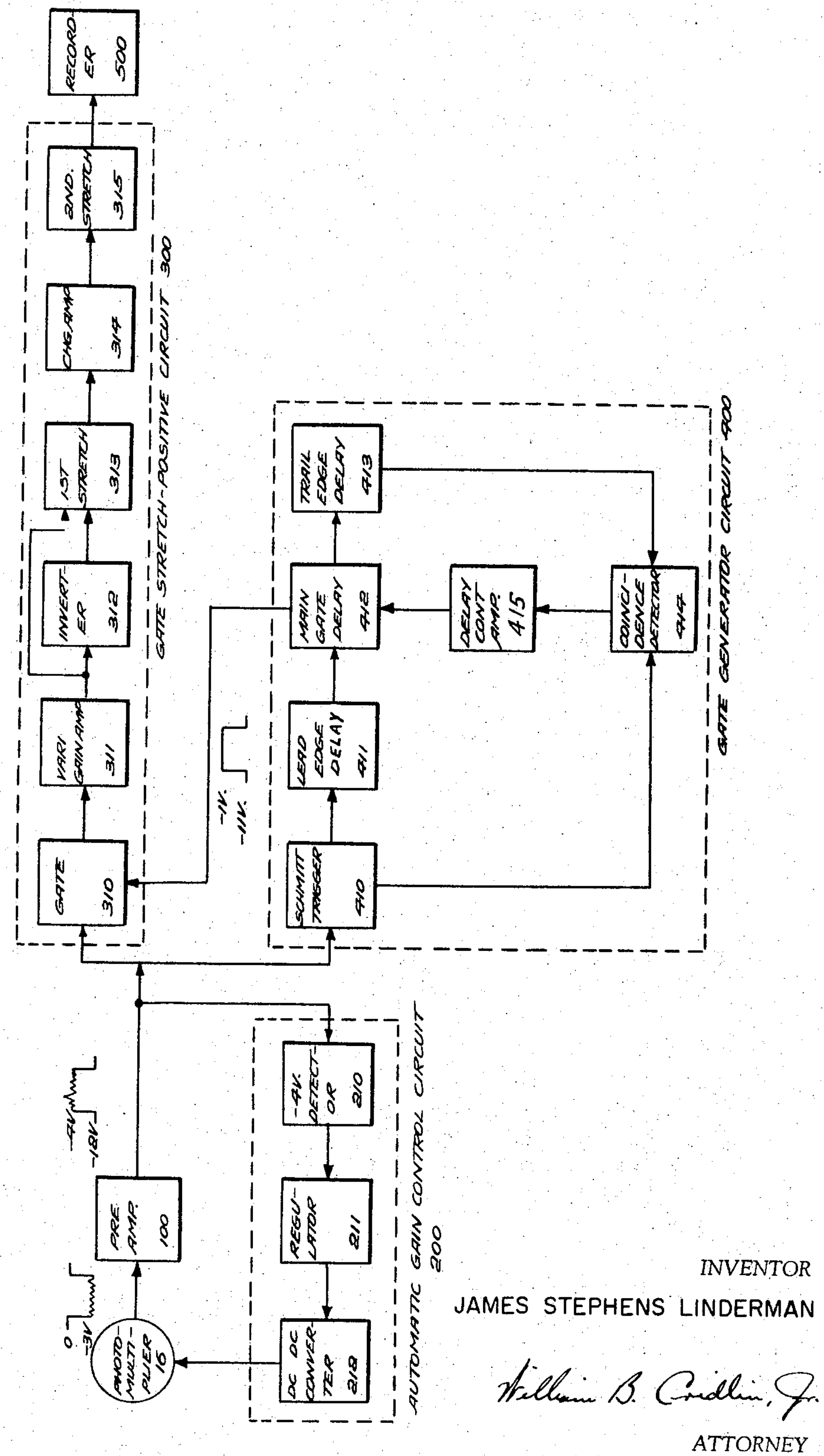
FIG. 2 represents a schematic block diagram of the defect detector.

Referring to FIG. 2, the pedestal-shaped signal is the input to the preamplifier circuit 100. The preamplifier 100 amplifies the signal and inverts its polarity. At the preamplifier output the voltage is −4 v. when the spot is on the web and −11 v. when the light spot is off. The amplified pedestal is the input voltage signal to the gate-stretch-positive circuit 300, gate generator circuit 400, and automatic gain control circuit 200.

The automatic gain control circuit 200 maintains the top of the pedestal at a −4 v. level by means of feedback control of the photomultiplier high voltage. This compensates for any long term changes in web reflectivity due to different products or changes in component characteristics of transistors, light sources or photomultiplier due to aging. The automatic gain control circuit consists of −4 v. detector 210, a regulator 211 for controlling the input voltage to the converter power supply 212 and the converter power supply 212 which supplies the high voltage to the photomultiplier 16. When the pedestal is more positive than −4 v., the detector 210 decreases its output voltage. Regulator output current and voltage are reduced to the converter power supply 212. This converter 212 has a proportional input to output gain of 100. A reduced input to the converter 212 reduces the high voltage to the photomultiplier 16 which in turn reduces and corrects the pedestal amplitude. A lower pedestal height causes an increase in photomultiplier high voltage again correcting the preamplifier pedestal height to −4 v.

The circuitry of the gate-stretch-positive circuit 300 performs three separate functions, gating out leading and trailing edges of the pedestal, inverting all negative defect signals to positive output pulses so that defects of both polarities are recorded, and stretching of the defect pulses so that they last long enough to be visible on a strip chart recorder 500. The pedestal signal from the preamplifier is differentiated in the gate circuit 310. The resulting leading and trailing edge spikes of the pedestal signal are gated out in the circuit 310. The gate circuit 310 is controlled by the output pulse from the gate generator 400. When the gate generator signal is at a −2 v., the gate is enabled, thus passing the pedestal signal. When the gate generator signal is at the −12 v. level, the gate is disabled. Defect signals, if present, are passed to the next stage, the main amplifier 311. The main amplifier circuit 311 has an adustable voltage gain up to 100. This is followed by an inverter 312 which inverts all negative going signals from the amplifier so that single polarity defect signals can be recorded at the output. Positive pulses from the main amplifier 311 and from the inverter (negative pulses from the main amplifier) are elongated in the first stretch amplifier 313. Typically, a one micro-second input pulse to this stage will have been increased to a one millisecond output. This is still not long enough for proper recorder operation so a further stretch operation is required. The charge amplifier 314 produces sufficient power to drive the second stretch circuit 315 and provide additional voltage gain of approximately four times. This circuit 315 extends the output pulse to approximately 100 milliseconds sufficiently long to drive the strip chart recorder.

As stated above, it is necessary to remove positive and negative spikes which are caused by the sharp rise and fall of the pedestal. The gate generator circuit 400 provides the control signal for the gate. Schmitt trigger 410 shapes the pedestal so that its leading and trailing edges have sharp rise and fall times. The leading edge of the squared pedestal signal triggers a 12 microsecond monostable multivibrator 411. The delay time is optional and can be varied as needed. At the end of the 12 microsecond delay, the trailing edge of the negative pulse of the delay signal triggers the main gate multi-vibrator 412 so that its output goes from −12 v. to −2 v. This output enables the gate 310 in the gate-stretch-positive circuit 300. The "on" time of the circuit 412 is determined by the output of the delay control amplifier 415. The turning off of the main gate multivibrator 412 turns on the trailing edge multivibrator 413. The negative output (−2 v. to −10 v.) of the trailing edge multivibrator 413 and the pedestal output (−10 v. to −2 v.) of the Schmitt trigger 410 are added in the coincidence detector 414. When the trailing edge of the signal from multivibrator 413 occurs after the trailing edge of the signal from Schmitt trigger 410 a control pulse is formed because the output of detector 414 goes below −8 v. This pulse width representing the difference in time between the trailing edges of both signals controls the "on" time of the gate multivibrator 412. If the main delay 412 output pulse is too long, the input to the delay control amplifier 415 increases. This in turn decreases the "on" time of the main gate delay circuit 412. When the trailing edge of the signal from 410 coincides with that of 413, the length of time of the signal from main gate delay circuit is correct.

Figure 3:
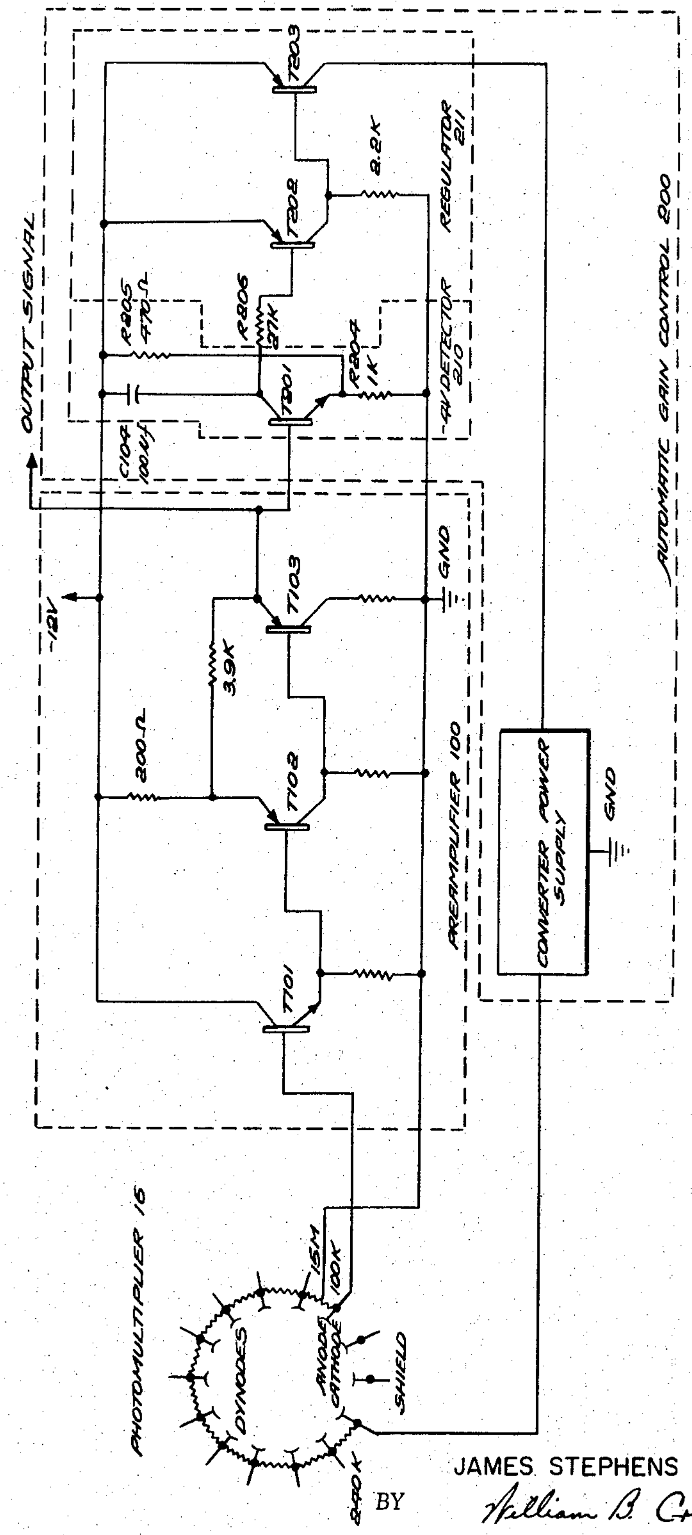
FIG. 3 is a detailed circuit diagram of the preamplifier.

The preamplifier 100 and automatic gain control circuit 200 are shown in detail in FIG. 3. The first stage of the preamplifier 100 is a transistor emitter-follower stage T101 that couples the high-impedance photomultiplier tube to the common emitter-amplifier stage T102. Amplifier T102 amplifies and inverts the pedestal so that it is positive, −12 v. to −4 v. Emitter follower T103 lowers the impedance of the signal to reduce noise pickup and to provide enough power for driving the automatic gain control circuit 200, the gate stretch positive circuit 300 and the gate generator circuit 400.

The first stage of the automatic gain control circuit is the −4 v. detector 210 having transistor T201. The emitter of T201 is held at −4 v. by the 1000-ohm and 470-ohm resistors, 204 and 205. When the pedestal is more negative than −4 v., the transistor T201 is cut off allowing the 100 μfd. capacitor 104 to discharge through the 27,000-ohm resistor 206 and transistor T202 of the regulator circuit 211. When the pedestal is more positive than −4 v., transistor T201 conducts negatively charging capacitor 104. Charging and discharging time constants of 104 are long enough to hold the capacitor voltage relatively constant between scans of the light beam. An increased negative capacitor voltage due to a greater pedestal height increases the conduction of T202 which in turn reduces the voltage on its collector. The reduced collector voltage reduces the conduction of regulator transistor T203 causing a lower voltage and input to the D.C. to D.C. converter power supply 212. This converter 212 has a proportional input to output gain of 100. Its output is the high voltage supply for the photomultiplier 16. A reduced input to the converter 212 reduces the high voltage to the photomultiplier 16 which in turn reduces and corrects the pedestal amplitude. A lower pedestal height causes an increased photomultiplier high voltage again correcting the preamplifier pedestal height to −4 v.

Figure 4:
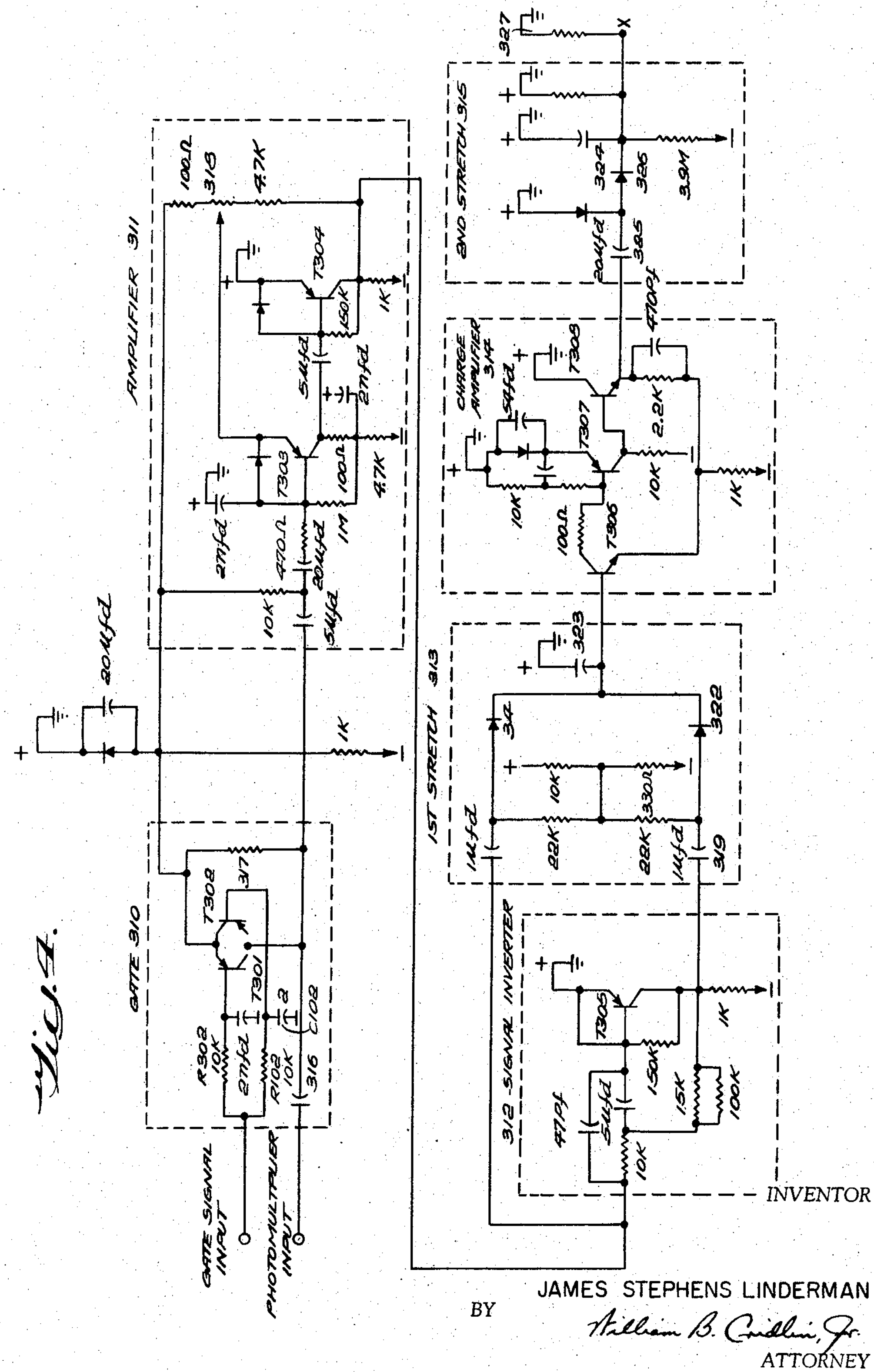
FIG. 4 is a detailed circuit diagram of the gate stretch positive circuit.

The gate-stretch positive circuit 300 is shown in detail in FIG. 4. The pedestal signal from the preamplifier 100 passes through a 2 nf. differentiating capacitor 316, in the gate circuit 310. The leading and trailing edges of the pedestal signal create large transient spikes that must be gated out. This is accomplished by transistors T301 and T302. When turned on by the Gate Generator 400, these two transistors short out the preamplifier input signal and prevent it from being passed on to the main amplifier 311. The two nanofarad capacitor 316 and 1000-ohm resistor 317 form a high pass filter that eliminates the signals from long-term pedestal signal irregularities.

The main amplifier circuit, composed of transistors T303 and T304, has a variable voltage gain of up to 100 which is controlled by the setting of the 5K potentiometer 318 in the emitter of T303. The position of the potentiometer is set to obtain the over-all system sensitivity desired. Negative defect signals are inverted by the unity gain inverter 312. The inverter 312 is a common emitter amplifier having transistor T305.

To combine the positive pulses from the main amplifier and from the inverter (negative pulses from the main amplifier) and to begin stretching these pulses so they will be visible on the recorder, a combination of 1-μf. coupling capacitors, 319 and 320, diodes 321 and 322 and the 1-nf. capacitor 323 is used. A positive pulse from either source charges a 1-nf. capacitor 323 whose discharge rate is controlled by the 1-megohm input impedance of the charge amplifier 314. Typically, a 1-μs. input pulse to the 1-nf. capacitor will have a proper decay time of 1 ms. This is still not long enough for proper recorder operation, so a further stretch operation is required.

The charge amplifier 314 produces sufficient power to drive the second stretch circuit and provide additional voltage gain of approximately 4 times. It is made up of transistors T306, T307, and T308 and their associated circuitry. The charge on the 1–nf. first stretch capacitor 323 is amplified and transferred into the second stretch circuit.

A second stretch circuit extends the output pulse to approximately 100 ms. The 1–μf. output capacitor 324 is charged through the 20–μf. coupling capacitor 325 and diode 326. Its discharge rate is determined by the 120K ohms input resistor 327 of the modified strip-chart recorder and is 100 ms. Point X is connected to the input terminal of the recorder 500.

Figure 5:
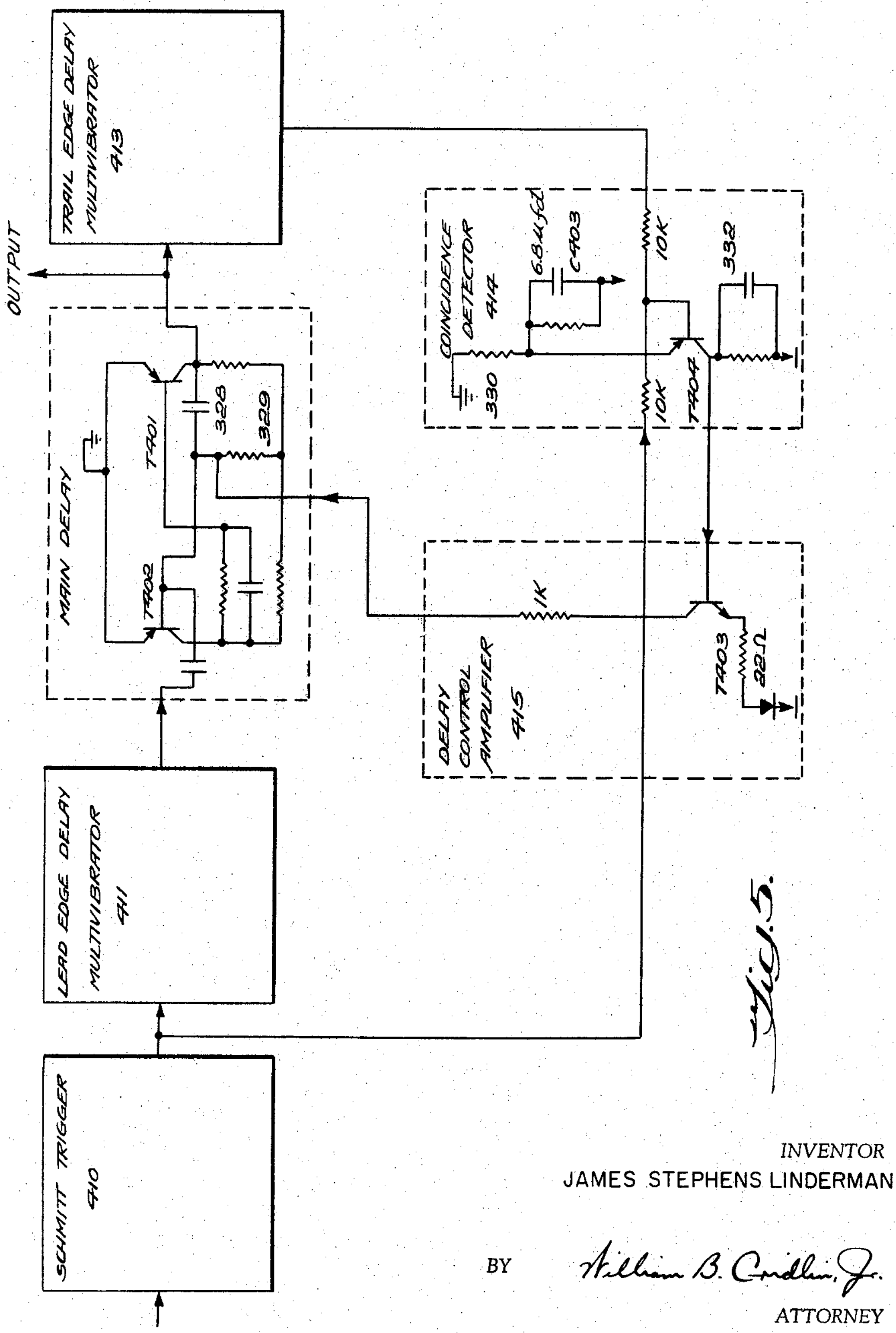
FIG. 5 is a detailed circuit diagram of the gate generator.

As stated above, the positive and negative spikes which are caused by the sharp rise and fall of pedestal are removed by the shunt gate 310 at the input to the main amplifier 311. The feedback circuit which turns off the main gate delay 12 microseconds before the trailing edge of the pedestal is shown in detail in FIG. 5. Any monostable multivibrator may be modified as described. Therefore, the operation of the main gate delay multivibrator 412 itself will be described only generally. Normally, transistor T402 is conducting and T401 is off. A positive going signal will cause T401 to conduct and T402 to cut off. The multivibrator will remain in the state for a length of time determined by the discharge of the capacitor 328 through the resistor 329 and the delay control amplifier 415. The more transistor T403 is turned on, the faster the discharge rate and the shorter the on time of the delay multivibrator 412. To insure that the main gate delay multivibrator 412 is reset at the proper instant the trailing edge of the main gate delay multivibrator output is used to trigger a second 12 microsecond delay multivibrator 413. The negative output (−2 v. to −10 v.) of the trailing edge multivibrator 413 and the positive output (−10 v. to −2 v.) of the Schmitt trigger 410 are both coupled through the 10K resistors to the base of T404. Under steady state conditions, the negative pedestal trailing edge will occur a little later, a few microseconds than the positive pedestal trailing edge from 410. Transistor T404 will only be turned on when the input is more negative than −8 v. since the emitter is held at this value by the 1000-ohm and 470-ohm resistors 330 and 331. A negative pulse of less than −8 v. occurs for the length of time that the trailing edge of 413 occurs after 410. If the main gate delay 412 output pulse is too long, the input negative pulse width increases turning T404 on for a longer time. Collector voltage is essentially constant during individual scans due to the large time constant of the 180 micro fd. capacitor 332. But with increased turn on time, the collector voltage will increase smoothly during a number of scans. This will increase the current in T403. As described above, the pedestal width will be shortened. An output control pulse that is too short will decrease the turn on time of T404, decreasing the current in T403 and increasing the gate signal width to its correct value.

The adjusting circuit described above automatically eliminates a preselected amount of the leading edge and trailing edge from the detector signal. If the web being inspected has perforations along the trailing edge these perforations will cause malfunction of the circuit as described. It is readily seen that this condition can be accommodated by replacing the trailing edge multivibrator with two sequential multivibrators which operates for the same total time. In this manner the perforation signals can be kept from affecting the coincidence detector.

What is claimed is:

1. A web defect detector device comprising (A) means for repeatedly scanning said web with light to indicate web defects by variations in light intensity;

(B) a photocell for receiving said light upon its passage from said web and producing an electrical pedestal shaped signal each time the light scans the web;

(C) power supply means to automatically provide said photocell with the necessary voltage to maintain a pedestal signal of constant amplitude;

(D) amplifier means to increase the strength of said pedestal signal;

(E) signal forming means for eliminating segments of the leading and trailing portions of said pedestal signal by gating said signal and converting any defect impulses on said signal to a size capable of being recorded;

(F) gate generating means to actuate said signal forming means in sequence to eliminate said pedestal leading and trailing edge segments, said gate means having signal delay means triggered by the beginning of said pedestal signal, gate actuating means actuated by said signal delay means to initiate said gate generating means, time delay means initiated by the discontinuance of the signal from said gate actuating means and detector means to compare the termination of said pedestal signal with a signal from said time delay means and adjust said gate actuating means according to said comparison; and (G) recording means to transcribe said defects.

2. In an apparatus for detecting defects in a web having means for scanning light across said web; a photocell to receive said light and produce a defect carrier signal for each scan of said web and a recorder for said signal the improvement which comprises gating means to remove segments of the beginning and end of said carrier signal said gate means having signal delay means triggered by the beginning of said defect carrier signal, gate actuating means actuated by said signal delay means to initiate said gate generating means, time delay means initiated by the discontinuance of the signal from said gate actuating means and detector means to compare the termination of said defect carrier signal with a signal from said time delay means and adjust said gate actuating means according to said comparison.

3. In an apparatus for detecting defects in a film having means for scanning non-actinic light across said web and a photocell to receive said light and produce a defect carrier signal for each scan of said film the improvement of eliminating segments of the leading and trailing edge of said carrier signal which comprises gating means for passing a specified portion of said carrier signal and gate generating means for providing the operating impulse for actuating said gate, said generating means comprising (1) a gate actuating multivibrator to drive said gate, said multivibrator being adjustable to discontinue said actuating before the entire carrier signal has passed, (2) a delay multivibrator, initiated by the discontinuance of said actuating multivibrator impulse, for issuing a signal for adjusting said discontinuance to occur at a specified time before the fall of said carrier signal, (3) a detector to compare said fall of said carrier signal with the fall of said delay signal and send any difference to said actuating multivibrator to adjust said discontinuance thereby eliminating the desired trailing edge segment of said carrier signal.

4. A gating circuit for removing a specific segment of the trailing edges of a series of reoccurring carrier signals where different series of said carrier signals can vary in duration said circuit comprising gating means for passing said carrier signal in response to an actuating impulse, control means for issuing said actuating impulse having a time delay means responsive to the termination of said impulse signal and a detector means to compare the termination of a signal from said time delay with the termination of said carrier signal and then adjust itself in accordance with said comparison to actuate said gating means whereby said segment is removed immediately preceding the termination of said carrier signal.

5. A gating circuit as defined in claim 4 wherein said time delay means is a multivibrator.

6. A gating circuit as defined in claim 4 where said control means has a capacitor to determine the duration of said impulse signal, the charge on said capacitor being varied in accordance with the results of said comparison from said detector means.

7. A self-adjusting gate circuit for removing a segment of the trailing edge of a pedestal shaped signal which comprises gating means for passing a specified portion of said pedestal signal and gate generating means for providing the operating impulse for actuating said gate, said generating means comprising (1) a gate actuating multivibrator to drive said gate, said multivibrator being adjustable to discontinue said actuating before the entire pedestal signal has passed, (2) a delay multivibrator, initiated by the discontinuance of said actuating multivibrator impulse, for issuing a signal for adjusting said discontinuance to occur at a specified time before the fall of said pedestal signal, (3) a detector to compare said fall of said pedestal signal with the fall of said delay signal and send any difference to said actuating multivibrator to adjust said discontinuance thereby eliminating the desired trailing edge segment of said pedestal signal.

8. A self-adjusting gate circuit as described in claim 7 having an amplifier between said detector and said gate actuating multivibrator.

References Cited

UNITED STATES PATENTS

| | | | |
|---|---|---|---|
| 2,393,631 | 1/1946 | Harrison et al. | |
| 2,719,235 | 9/1955 | Emerson | 250—209 |
| 2,803,755 | 8/1957 | Milford | 250—230 |
| 2,866,376 | 12/1958 | Cook | 88—14 |
| 3,020,033 | 2/1962 | McGreanor et al. | |
| 3,026,415 | 3/1962 | Lake et al. | 250—209 |
| 3,061,731 | 10/1962 | Thier et al. | 250—219 |
| 3,096,443 | 7/1963 | Laycak | 250—219 |
| 3,188,489 | 6/1965 | Dorsey | 307—88.5 |
| 3,201,602 | 8/1965 | Norwalt | 307—88.5 |
| 3,264,480 | 8/1966 | Zuck et al. | 250—219 |

ARCHIE R. BORCHELT, *Primary Examiner.*

RALPH G. NILSON, *Examiner.*

M. A. LEAVITT, *Assistant Examiner.*